(12) United States Patent  
Jenkins et al.

(10) Patent No.: US 7,320,275 B2  
(45) Date of Patent: Jan. 22, 2008

(54) SEASONING DEVICE AND METHOD FOR PREPARING FOODS

(75) Inventors: Nevin Jenkins, Homosassa, FL (US); Martin Fleit, Miami, FL (US); Antonio Lebron, Spring Hill, FL (US)

(73) Assignee: Seasoning Sticks, LLC., Homosassa, FL (US)

( * ) Notice: Subject to any disclaimer, the term of this patent is extended or adjusted under 35 U.S.C. 154(b) by 569 days.

(21) Appl. No.: 10/357,299

(22) Filed: Feb. 3, 2003

(65) Prior Publication Data

US 2004/0149146 A1 Aug. 5, 2004

(51) Int. Cl.  
*A47J 37/10* (2006.01)

(52) U.S. Cl. .............. 99/345; 99/494; 99/532

(58) Field of Classification Search .......... 99/345–347, 99/493, 494, 532–535; 222/80–82, 89; 426/281, 426/282, 92, 102, 89, 518  
See application file for complete search history.

(56) References Cited

U.S. PATENT DOCUMENTS

| | | | | |
|---|---|---|---|---|
| 2,212,477 | A | * | 8/1940 | Mayer .................. 99/532 |
| 2,544,316 | A | * | 3/1951 | Higgins ................. 99/532 |
| 2,602,391 | A | * | 7/1952 | Pedranti et al. .......... 99/345 |
| 2,887,035 | A | * | 5/1959 | De Seversky ............ 99/494 |
| 3,530,785 | A | * | 9/1970 | Peters et al. ............ 99/532 |
| 4,414,885 | A | * | 11/1983 | Kelly .................. 99/494 |
| 6,725,764 | B2 | * | 4/2004 | Sherwin ................ 99/419 |

* cited by examiner

*Primary Examiner*—Timothy F. Simone  
(74) *Attorney, Agent, or Firm*—Martin Fleit; Paul D. Bianco; Fleit Kain Gibbons Gutman Bongini & Bianco, P.L.

(57) ABSTRACT

A seasoning implement composed of an elongated hollow member loaded with a seasoning and having a plurality of axially spaced openings for inserting into a food mass. The hollow member provides a driving force to expel the seasoning. The hollow member may be a two-component assembly. A first component includes a hollow shaft defining a plurality of holes and has a point on one end and is open on its other end. The second component includes a cap. The two components are mutually engageable in a secure coupling. The seasoning is in the form of a powder or solid mass composed of a binder matrix holding a seasoning or mixture of seasonings. The binder disintegrates during heating of the food to release the seasoning and enable the implement to expel the seasoning into the food.

9 Claims, 3 Drawing Sheets

SEASONING DEVICE AND METHOD FOR PREPARING FOODS

BACKGROUND OF THE INVENTION

1. Field of the Invention

The present invention relates to a seasoning device or product, and more particularly to a method for preparing and seasoning foods, especially meats and poultry.

2. Prior Art

The seasoning of food in preparation for cooking, as well as, the seasoning of food during cooking is well known in the art. Usually the seasoning, in the form of a powder or granulate, is sprinkled onto the food, or mixed into the food, prior to and/or during cooking, broiling, baking or so forth. Whereas these techniques are satisfactory in general for foods, in the case of meats, fish and poultry, the texture and density of this type of food is such that sprinkling powders on top of the food may be unsatisfactory from several viewpoints. For example, if meat, fish or poultry is being broiled or baked, the high heat at the surface of the meat or poultry may be such as to cause any seasoning on the surface to burn or scorch, rendering it ineffective, or worse, giving a bad taste to the broiled food. Accordingly, to avoid this problem, frequently, the food is marinated or a liquid or sauce is applied to the surface of the food during heating by basting. In either case, penetration of the seasoning throughout the food is problematic.

SUMMARY OF THE INVENTION

Accordingly, it is the principal object of the present invention to provide a new device to effect seasoning (flavors, spices, condiments and herbal ingredients) of foods during cooking that enables the disadvantages of the prior art to be overcome. This is accomplished by incorporating the seasoning in a device or product that is inserted into the food during cooking, and whereby the seasoning is released into the food in an appropriate form to effect appropriate seasoning in an efficient and efficacious manner This novel device consists of a delivery system for seasoning that in one embodiment comprises a small pointed implement into which the seasoning can be loaded. The implement is then inserted into the food by pressing or pushing the implement directly into the food, whether it be meat or poultry whereupon, as the food cooks, the seasoning within the implement is expressed or forced into the food at appropriate depths to produce a good seasoning effect. In a second embodiment, the implement is comprised of the seasoning, with or without additional ingredients, which are food safe, and the implement is self-disintegrating during the food cooking process and passes into the food.

Other objects and advantages of the invention will be readily understood from the following detailed description of preferred embodiments of the method and apparatus and the product and the novel device for making openings when taken in conjunction with the appended drawings.

DETAILED DESCRIPTION OF PREFERRED EMBODIMENTS

Figure 1:
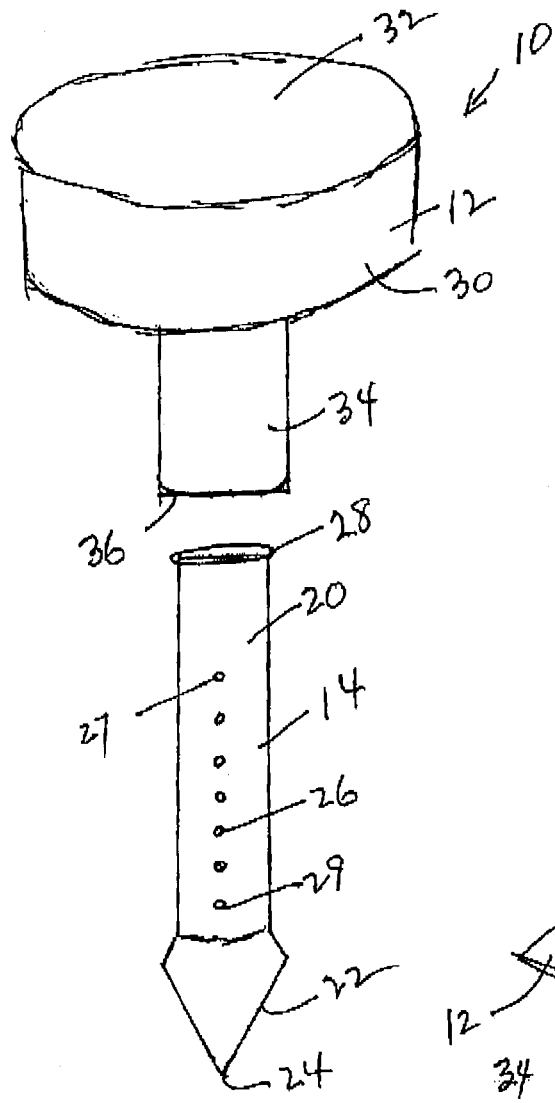
FIG. 1 shows in perspective, in exploded view, an embodiment of the present invention showing a novel device for carrying and delivering seasoning and for making openings in food, particularly, meat, fish and poultry.

The invention will now be described in detail regarding preferred embodiments. The present invention has for its objective the delivery of seasoning (flavors, spices, condiments and herbal ingredients) in a predetermined or selected form, such as, pure powders or granules, or mixtures of selected seasonings in powder form with an FDA approved food binder in a variety of ratios such as from about 0.1% by weight to about 10% by weight of binder with the remainder being essentially seasoning powder having a particle size of from about 1 micron to about 125 microns diameter, the preferred range for the present invention being that the seasoning powder has a particle size of from 8 to 40 microns diameter. One point of criticality to the invention is the particle size. To obtain the requisite particle size it is preferred that the seasoning be ground using dense phase fluid energy milling as obtained using a jet mill such as a model DPM@ mill as sold by CCE Technologies, Inc. of Cottage grove, Minn., USA. Such a mill is capable of grinding the seasoning down to a particle size of about 1 to 1.75 microns and particle sizes large as desired.

The amount of binder is a function of bonding the seasoning powder or establishing a matrix for holding and bonding the seasoning powder to obtain a product form that can be easily handled. The resulting solid product must not be so friable that it will breakup during handling or when exposed to ambient conditions. The preferred ratio of binder to seasoning is from about 0.1% to about 5% to establish the appropriate bonding or matrix structure during compression, compaction or extrusion. There may be, of course, additional ingredients in the mixture such as lubricants, mold release agents, and the like, which are present to enhance the forming of the mixture into a suitable solid in accordance with the concepts of the invention. In particular, it is an aspect of the invention that the seasoning may contain a meat tenderizer, as known in the art. Such additional ingredients would be known to those skilled in the art from the literature and from a manufacturer's specifications and recommendations for use of a particular binder.

The mixture may be then converted into a solid form by compression, compaction or extruding, or by any other technique that will produce the desired solid form of the invention. Again, these techniques are well known to those skilled in the art from the literature and a manufacturer's specifications and recommendations for use of a particular binder. In this respect, the predetermined or preselected solid form is one of a stick, rod, thread, band, tube and ribbon having a relatively small cross section and diameter or thickness, e.g. less than about 0.25 inches in diameter, and preferably less than about 0.1 inch in diameter, with a preferred diameter suitable for insertion into the shaft of the novel device described in hereinafter. The geometry of the solid form from the standpoint of periphery or cross section may be circular (round), elliptical, rectangular, ribbon-like, thread-like, polygonal or irregular, provided it can be loaded into the shaft as will be described.

If the seasoning is in powder or solid form, the particle size is critical in order that the seasoning will be delivered out of the shaft and into the food where it can migrate in the food when released from the binder. The preferred particle size is from about 1 micron to about 125 microns in diameter, and preferably from about 8 microns to about 40 microns in diameter, with the most preferable diameter being about 20 microns in diameter. It will be appreciated that the actual particle size will depend on the seasoning being used or the combination of ingredients being used; this will usually dictate particle size, and will be readily determinable without the need for any excessive experimentation. The seasoning is either purchased from a supplier at the correct particle size, if obtainable, or must be ground in a mill known in the art for this purpose, and as noted previously, a jet mill is preferred of the type and kind noted. Also, as noted, this is a point of the invention.

If a food binder is used, a variety of materials or ingredients may be used, provided the binder will result in a solid form that is characterized with a lack of friability so that it can withstand ordinary handling prior to being loaded into the shaft without breaking up. When the implement of the present invention is inserted into the food and subjected to heating, the heating of the food by baking or broiling or grilling, will cause the binder to cease its function of binding (liquefy, dissolve or otherwise disintegrate) and release the seasonings whereby they will be delivered into the food by the action of the implement of the present invention. Known binders are presently available that according to manufacturer's specifications will perform according to appropriate criteria as necessary for the present invention. The criteria or conditions that need to be pre-established include temperature (liquefying when the temperature reaches 90 to about 140 degrees F., preferably 100 to 130 degrees F.), or rate of dissolution (dissolving after 5 to 60 minutes after insertion into the meat, fish or poultry) that will result in the binder releasing the seasoning enabling delivery of the seasoning into the food whereupon it will migrate throughout the food or work its magic in the meat, fish or poultry.

Binders that are satisfactory in the present invention, when a binding is used, depend on the manner of mixing or compounding with the seasoning and the additional ingredients recommended by the manufacturer. The preferred binder for the present invention is AVICEL, cellulose gel NO. 105, pharmaceutical grade; AVICEL is a trademark for a binder product comprised of microcrystalline cellulose made by FOOD MACHINERY CORPORATION of Chicago, Ill. (FMC). The commercial binders that can be used will indicate the best technique to be used to obtain the solid form, whether this form is obtained by being compressed, extruded or compacted. For example, in addition to the preferred binder AVICEL, one binder that is particularly useful for the present invention is sold by BASF Corporation under the tradename PLURONIC F127, which is binder consisting of a copolymer of ethylene oxide and propylene oxide. The advantage of this binder is that is can be used with seasonings to produce an appropriate solid form as described that will not breakup during handling and which will readily be deliverable into food by the present invention when the implement of the present invention is inserted directly into meat, fish or poultry or into an opening made in the meat, fish or poultry. Also, this binder has the advantage that it can be formulated, according to the instructions given by the manufacturer, so that it will disintegrate at a preselected or predetermined temperature. Therefore, when using this material as a binder to capture seasonings in solid form as described, it will disintegrate, and release the seasonings at the preselected or predetermined temperature while the food is being heated in an oven or on a grill. In the preferred embodiment for meat, fish and poultry, the preferred release temperature range is from about 90 degrees F. to about 140 degrees F., with the preferred release temperature range being about 100 to about 130 degrees F. The seasoning loaded into the implement of the present invention, upon delivery will migrate or otherwise spread throughout the meat, fish or poultry effecting seasoning throughout.

As noted previously, the use of the seasoning in powder or granular form only requires the powder or granules be loaded into the implement of the invention. On the other hand, if the seasoning is used with a binder to obtain a solid form, the binding of the seasoning can be carried out generally by subjecting the mixture of binder and seasoning to compression, extrusion or compaction, such techniques being well known and understood by persons skilled in the art from the literature and from the manufacturer's specifications and recommendations. However, according to one aspect of the invention, the force of compression is preferably about 4 tons. Thus, no effort will be made herein to describe these processes or techniques in detail, or to describe the additives or other ingredients recommended by manufacturers for such formulation or use. As noted above, in the preparation of the mixtures of binder and seasoning, other ingredients may be added, such as lubricants, mold release agents like magnesium stearate and so forth, the uses for which are all well known in the art and contained in manufacturer's specifications and recommendations.

Regarding the binders which can be used, the following list is given, but the list is by no means limiting or all inclusive as persons skilled in the art will readily know what binders are suitable for use in the present invention from the descriptions herein. Suitable binders include PLURONIC F127; maltodextrins and corn syrup solids e.g. MALTRIN, a family of products made by Grain Processing Corporation; molasses; carnuba wax; carageenans; Aqualon, a product made by Hercules Corporation; alginates; PLASDONE and POLYPLASDONE, a range of products made by International Specialty Products as binders and disintergrants for wet and dry granulation processing and for direct compression; microcrystalline cellulose such as AVICEL made by FMC. As noted the list is not comprehensive and other binders will be known to those skilled in the art that are usable with the present invention.

The seasonings that are usable with the present invention are many and varied and are known to those practitioners of the culinary arts. The seasonings include all spices, herbs, condiments and flavorings. The seasonings can be used individually or in any combinations. To list only a few, there are garlic in clove or powder form, lemon peel, pepper, salt, oregano, parsley, dill, tarragon, thyme, cayenne pepper, rosemary, and so forth.

To make the seasoning for incorporation into the implement of the present invention, the seasoning of choice, whether it is a single seasoning or a mixture of seasonings is processed into powder or granular form in any manner as well known to those skilled in the art. Seasonings in powder or granular form are readily obtainable from manufacturers of seasonings either as off the shelf items or as specially prepared by the manufacturer. On the other hand, if the seasoning is to be loaded into the implement of the present invention in a solid form using a binder, a suitable binder, comprising one or a combination or formulation of the known food binders, is mixed with one or a combination of seasonings in appropriate powder or granular form and the mixture is either extruded, if an appropriate condition for processing in this manner, or subjected to compaction or compression in a suitable machine designed for this purpose, as is well known in the art, in order to obtain a solid elongated form of a cross sectional geometry as noted previously, in stick, rod, thread, ribbon, tube or band form in whatever lengths desired for loading into the implement of the present invention.

If in a solid form as described above, the form can have a cross section throughout in which the seasoning is uniformly distributed in the binder. Also, it is possible to arrange the solid form so that it has two layers or more, like rings of a tree, in which the composition and/or concentration of the seasoning in the binder varies, or in which the mixture of seasonings is different in each layer. Further, the layers may have amounts of binders or contain other ingredients that will give the layers a differential release time. Further, it is possible to have the layers arranged to give a sustained release of the seasoning or seasoning composition during heating. Alternatively, the solid form may have a cross section in which the seasonings with a very small quantity of binder are contained in a core that is surrounded by a thin annulus or shell of binder to give the solid form the required rigidity and release time. In another form the solid form may consist of a rigid core of binder that carries a shell or annulus of seasonings with a very small quantity of binder. The solid form can be elongated as mentioned previously or in spherical form (pellets) with a diameter of from about 0.01 to about 0.25 inches as long as the pellets can be loaded into the implement of the present invention as will be described herein after. In the latter case, i.e., pellets, the products can be made using any known agglomeration and coating techniques, including fluidized bed techniques. In these fashions, the amount of binder associated with the seasonings is very small and easily releases the seasonings when delivery is occurring. The form of having an annulus or shell of binder enables the shell to gradually disintegrate (due to whatever action is appropriate, preferably temperature) during the initially phases of the heating of the food, and enables a quick release of the seasonings at the appropriate moment in the heating process for delivery out of the novel implement of the invention and into the food. The important point in the method is that the binder melts, liquefies, dissolves or otherwise disintegrates to release the seasonings so it can penetrate throughout the food during heating, especially when the food reaches a particular temperature, preferably about 10° F. to about 60° F. below the temperature the food will reach at the end of heating. The temperature for release and delivery of the seasoning should be that temperature most favorable to the seasoning's action, as noted previously.

Referring now to the drawings, a novel device is shown that can be used for assisting in the insertion of solid seasoning products as described above. The first embodiment of the novel implement of the invention, generally designated by reference numeral 10, is shown in FIGS. 1-4, and consists of two components, a cap 12 and a shaft 14. The shaft 14 is an elongated, tubular, axially extending shank 20 that is circular in cross section that is closed, flattened and shaped at its lower free end 22 into a sharp point 24. Shank 20 is provided with a series of axially spaced holes 26 that may be of uniform diameter or may be of graduated diameter with the smallest hole 27 at the top and the largest 29 at the bottom adjacent the point 24. The upper end 28 of the tube or shank 20 of shaft 14 is open. The internal diameter of shaft 14 is approximately 1/16 to 1/4 inch, it length is about 1/2 to 1 inch and the point 24 is about 1/16 inch long. The external diameter is about 1 to 5 mils greater than the i.d., and therefore, the wall thickness is about 1-5 mils. The shaft 14 provides a receptacle or container for receiving a load of seasoning in either powder, granular or solid form, which can be loaded into the open top 28.

The second component depicted in FIG. 1 is a cap 30 that consists of a hollow, closed cylinder 32 with a flat top from which depends a receiving tube 34 open at its lower end 36 and communicating with the hollow interior of the cylinder 32. The cylinder 32 is about 1/8 to about 1/2 inch in diameter and about 3/8 inch long. The tube is about 1/4 inch long and about 1/8 inch in diameter. The i.d. of tube 34 is about the same as the o.d. of shaft 14, at least at its upper open end 28, so that the upper open end 28 of shaft 14 can be inserted into the open lower end 36 of tube 34 in a slight interference or frictional fit. This will securely hold the two components together while enabling separation manually without too much difficulty. The shaft 14 is filled or loaded with seasoning, either powder or granules or in solid form as described, to above the upper hole 26,27.

When the two components of the embodiment shown in FIG. 1 are loaded and put together, the implement is now ready for insertion into a food, e.g. a steak. The cap 30 can be engaged by the heel of the hand or the thumb so that pressure can be applied to the shank 20 to drive the point 24 into a piece of meat, fish or poultry and situate the implement in the food so that it can enable seasoning when the food is heated. This process is repeated at spaced locations on the piece of meat or poultry being seasoned using a plurality of implements. Each implement when assembled contains the seasoning loaded in the shaft 14 and a body of air, at ambient temperature (room temperature) or cooled by having been in a refrigerator just prior to insertion into the food, trapped in the cap 12 and the space above the seasoning, which covers the top hole 26,27. As the food is cooked or heated, the trapped air expands as its temperature rises due to the heat transfer through the cap 12 providing a driving force. Both the cap 12 and the shaft 14 are preferably made of stainless steel to be reusable after cleaning in a dishwasher, although it is possible to use aluminum or a suitable plastic approved for use with food. Also, a desirable embodiment contemplates using a stainless steel cap 12 with a single use, disposable plastic shaft 14, or single use, disposable plastic cap 12 and single use, disposable shaft 14 for both components to be completely disposable after single use.

Figure 2:
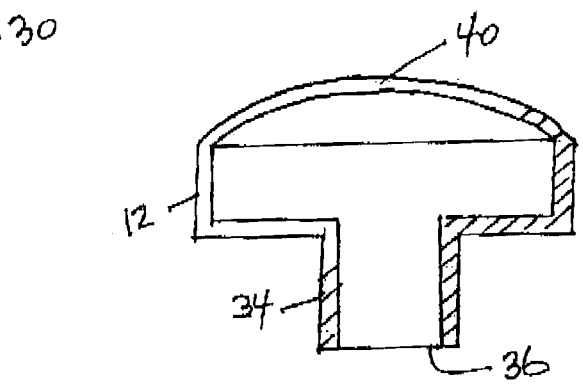
FIG. 2 shows in a sectional view of the cap of the device of FIG. 1 taken through an axial plane showing a modification of the geometry of the cap as shown in FIG. 1.
Figures 3, 4:
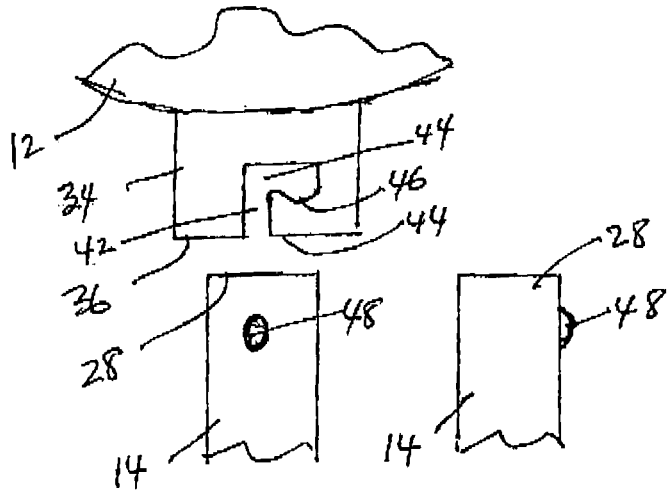
FIG. 3 shows in a side view a detail of the device of FIG. 1, showing a modification of the manner for coupling the cap and shaft.
FIG. 4 shows in a view displaced 90 degrees of the top of the shaft as shown in FIG. 3.
Figure 5:
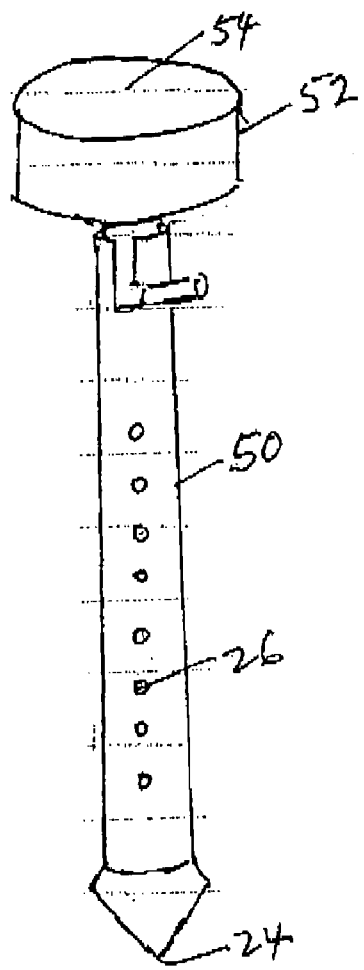
FIG. 5 shows in perspective an alternative embodiment of the present invention.
Figure 6:
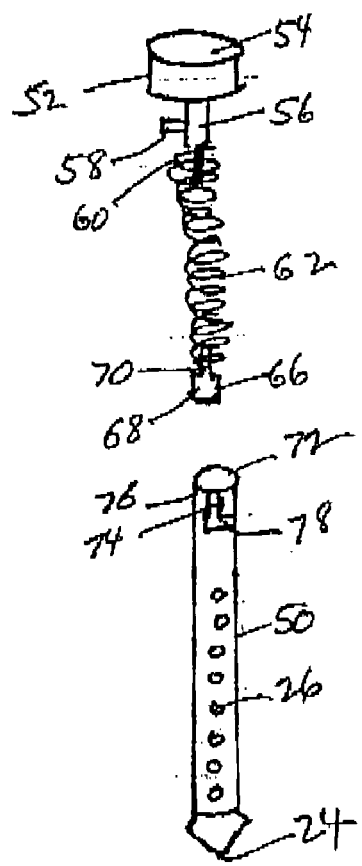
FIG. 6 shows an exploded view of the embodiment shown in FIG. 5.
Figure 7:
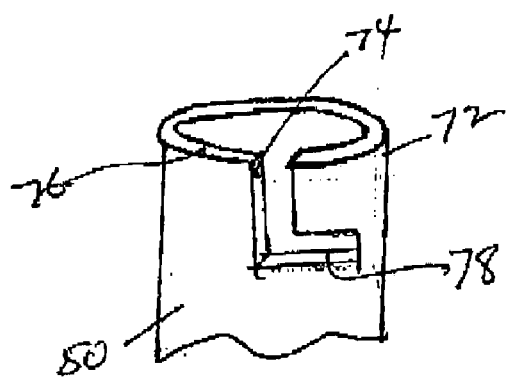
FIG. 7 shows in perspective the upper end of the shaft in detail.

FIG. 2 shows a variation or modification of the implement shown in FIG. 1, the difference being that the top of cap 12 is dome-shaped as indicated by reference numeral 40. FIG. 3 shows an exploded view of the tube 34 and the upper end 28 of the shaft 14, illustrating a modification. In place of the friction fit, or as a supplement to the friction fit, the lower end 36 of the tube 34 defines an axial slot 42 that extends from the lower edge 44 of tube 34 upwardly toward the cap 12 and terminates with an intersecting right angle slot 44 having a cutout or recess 46 on its side proximal to the lower edge 44. From FIGS. 3 and 4, one can see that the upper end 28 of the shaft 14 has a projection or dimple 48 that protrudes outwardly. When the components 12 and 14 are to be assembled, the shaft 14 is turned so that the dimple 48 lines up with the entry to the slot 42, the shaft 14 is pushed into the tube 34 until the dimple is aligned with the transverse slot 44 whereupon the shaft 14 and cap 12 are rotated relatively to move the dimple 48 into the slot 44 and into the recess 48. In this position the coupling between the shaft 14 and cap 12 is secure. Whereas the recess 48 is desirable, it can be eliminated, i.e. its use is optional.

Figure 8:
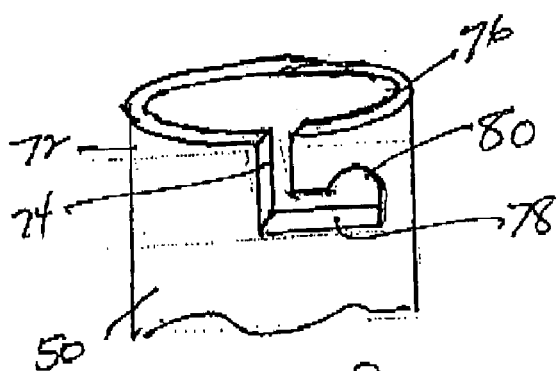
FIG. 8 shows in perspective the upper end of the shaft in detail showing a modification.

Referring now to FIGS. 5-8 a second embodiment will be described. As shown, the implement of the present invention consists of two components, a shaft 50, similar to the shaft 14 of FIG. 1, and a cap member 52. The cap member 52 consists of a top solid cap 54 of cylindrical form with an integrally formed depending axial stub 56. Stub 56 has projecting at right angles an integrally attached or formed projection 58 in the form of a short rod. The top end 60 of a tension spring 62 is fixed or mounted on the stub 56 in a manner not to be easily detached. A fitting 66 consisting of a cylindrical solid plug 68 having an integrally formed upwardly extending axial rod 70 is fixed or mounted to the lower end of spring 62 in a manner not to be easily detached. The cap member 52 so assembled and contrived with respect to its dimensions to fit within the shaft 50. Shaft 50 is provided at its upper end 72 with an axial slot 74 that extends from the edge 76 of the upper end 74 and intersects with a right angle or transverse slot 78. The shaft 50 has the same point 24 and holes 26 as described previously. In this embodiment, the seasoning is loaded into the shaft 50, in the manner previously described, and the cap member 52 is inserted into the shaft 50 by initially inserting the fitting 66, compressing the spring 62 and inserting the stub 56 with the projection 58 aligned with the slot 74, and finally rotating the cap member 52 and shaft 50 relatively, so that the projection 58 enters the slot 78, and comes to rest, preferably to its end. As shown in FIG. 8, the slot 78 may be provided with a cutout or recess 80 on its side proximal to the upper edge 76 for repose of the projection 58 and to provide greater security. The spring 62 provides the driving force to expel the seasoning at the appropriate time in the heating of the food.

Figure 9:
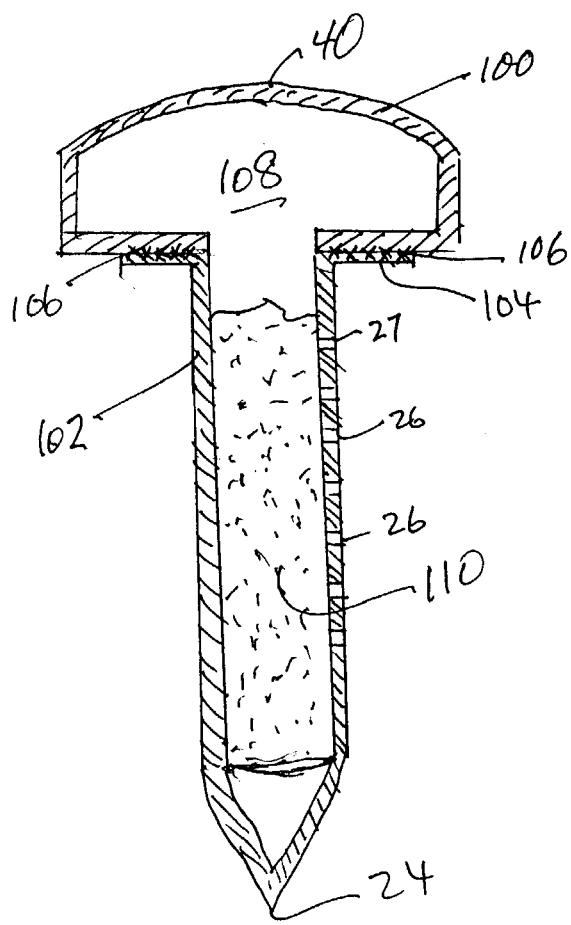
FIG. 9 shows another embodiment for a disposable implement.

Referring now to FIG. 9, an embodiment is shown that is disposable. The implement is made of a disposable plastic of the kind noted above, and consists of a hollow cap 100 having a dome 40 that is hermetically heat sealed to the elongated shaft 102. Shaft 102 has a top flange 104 that abuts the bottom of the cap 100 and the heat seal is indicated in the drawing by the reference numeral 106. The remaining structure of FIG. 9 is similar to that of the embodiment of FIG. 1, and like parts have been designated by the same reference numbers. As shown, the seasoning 110, in a form as described previously, is loaded into the shaft 102 to a level above the top hole 27 of the axially spaced hole 26 of shaft 102 leaving above the seasoning 110 an air mass 108 trapped in the hollow cap 100.

Figure 10:
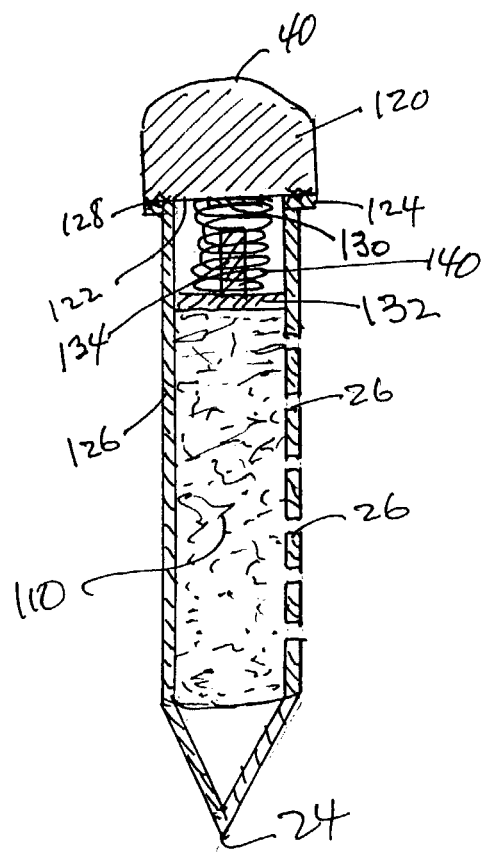
FIG. 10 shows still a further embodiment for a disposable implement.

Referring to FIG. 10, another disposable embodiment is shown that consists of a solid cap 120 that has hermetically heat sealed at 128 to its underneath surface 122 the top flange 124 of elongated shaft 126 characterized by axially spaced holes 26. A boss 130 is integrally molded to the underneath surface 122, and spaced below is a piston 132 having integrally molded to its upper surface a guide stub 134. Fitted between the mounting boss 130 and the upper surface of the piston 132 is a compressed spring 140, with the stub serving as a guide. The parts of the embodiment of FIG. 10 are all molded from a plastic as previously described, and the implement depicted is disposable. The seasoning mass is loaded into the shaft 126 in the space below the piston 132. In the embodiment shown in FIG. 9 the driving force to expel the seasoning through the holes 26 is provided by the expansion of the air mass 108, which generates the required pressure when the air mass is heated during the heating of the food. In the embodiment shown in FIG. 10, the driving force to expel the seasoning through the holes 26 is provided by the compressed spring 140. In both cases, the seasoning, when heated during the cooking of the food, will be subjected to a transformation that will enable the seasoning to be expelled through the holes 26 into the food in which the implement has been inserted.

Figure 11:
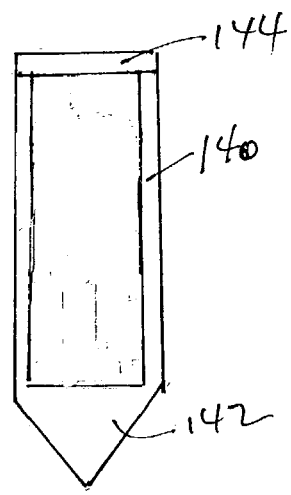
FIG. 11 shows in longitudinal cross section a still further embodiment for a self-disintegrating implement.

The embodiment shown in FIG. 11 is a self-disintegrating implement that is comprised of a hollow cylinder 140 of seasoning in solid form as described above that has been formed with a solid point 142 and to which a solid cap 144 of seasoning in solid form has been sealed to the open top of cylinder 140 to hermetically seal the implement. Air is trapped within the cylinder 140, and preferably the trapping of the air occurs under low temperature conditions to increase the loading thereof. When the device of FIG. 11 is inserted into food, the cooking of the food will cause the air inside the device to expand exerting a force to inject the seasoning into the food when it disintegrates at the elevated temperatures of cooking as described. A coating can be applied to the exterior of the device that is food safe that will aid with the hermetic sealing.

Figure 12:
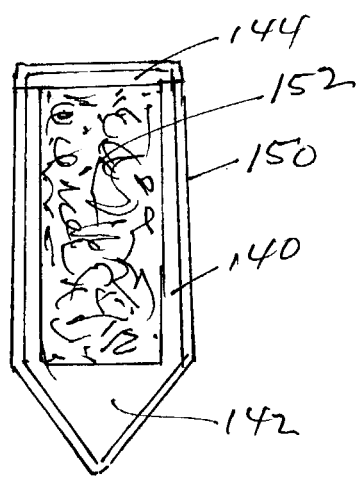
FIG. 12 shows in longitudinal cross section yet another embodiment for a self-disintegrating implement.

A further embodiment of a self-disintegrating device or implement is shown in FIG. 12. As shown, the implement is comprised of the same cylinder 140 with solid point 142 and sealed solid cap 144, but in this case, a harder shell 150 surrounds the entire package to give it more structural integrity. Shell 150 is the seasoning with binder, but is compressed to a stronger form, either due to the degree of compression or the binder used. Within the cylinder 140 is contained a mass of seasoning 152, preferably in granular form, that contains a small quantity of free water or releasable water, or a suitable gas generating material so that when subjected to heating, the water will be vaporized or the gas will be generated causing a build up of internal pressure and assist in the fracturing of the cylinder 140 as it disintegrates due to the increasing temperature, and the added pressure will assist in the injection of the seasoning into the food. Of course, care must be taken to control the amount of pressure generated, but as the implement is so small, this can easily be managed.

Whereas the invention has been shown and described in terms of preferred embodiments, nevertheless changes and modifications are possible which do not depart from the teachings herein. Such modifications and changes as are apparent to one skilled in the art are deemed to fall within the purview of the invention as claimed.

What is claimed is:

1. A seasoning-loaded implement for inserting into a food mass comprising an elongate hollow shaft having an open upper end and a closed lower tip end for penetrating into a food mass, said hollow shaft being characterized with a plurality of axially longitudinally spaced openings extending from adjacent the lower tip end to adjacent, but spaced from the open upper end of the hollow shaft, a solid mass of seasoning received in the hollow shaft to a level above the opening adjacent the upper open end of the shaft covering the said opening and sealing the shaft, said solid mass of seasoning composed of a compressed mixture of seasoning powder and a FDA food approved binder, said solid mass of seasoning liquefying at a temperature of from about 90 degrees F. to about 140 degrees F., said powder having a particle size of from about 1 micron to about 125 microns in diameter and the-ratio-of binder to seasoning is from about 0.1% by weight to about 10% by weight, a hollow top cap having a top end of substantial greater diameter than the diameter of the hollow shaft to define an air chamber and a bottom depending hollow shaft in communication with the air chamber and terminating in an open bottom end, said open upper end of the hollow shaft coupled to the bottom open end of the bottom depending hollow shaft of the hollow top cap in a secure airtight fit trapping air in the hollow top cap, whereby when the seasoning-loaded implement is inserted into a food mass, and heated sufficiently, the air trapped in the air chamber of the top hollow cap will become pressurized and drive liquefied seasoning out of the openings of the hollow shaft into the food mass.

2. A seasoning-loaded implement according to claim 1 wherein the seasoning is one of a solid mass, granules and a powder.

3. A seasoning-loaded implement according to claim 1 wherein the shaped mass is encompassed by a shell made of the binder material.

4. A seasoning-loaded implement according to claim 3 wherein the shaped mass has a solid core of binder.

5. A seasoning-loaded implement according to claim 1 wherein the shaped mass is composed of a plurality of layers.

6. A seasoning-loaded implement according to claim 1 wherein holes are graduated in size.

7. A seasoning-loaded implement according to claim 1 wherein the particle size of the powder is from 8 to 40 microns.

8. A seasoning-loaded implement according to claim 1 wherein the particle size of the powder is about 20 microns.

9. A seasoning-loaded implement according to claim 1 wherein the top of the hollow cap is flat.

* * * * *